H. G. BRADLEY.
GLASS GRINDING AND POLISHING MACHINE.
APPLICATION FILED JULY 9, 1915.
1,183,947.
Patented May 23, 1916.
2 SHEETS—SHEET 2.
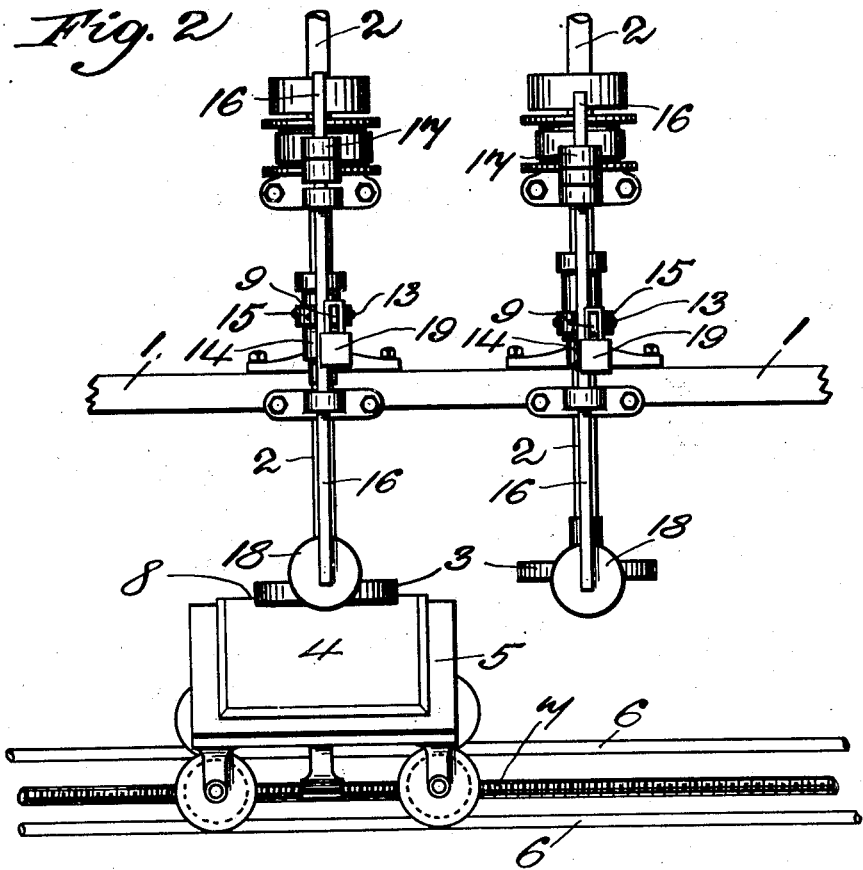
INVENTOR:
Harold Gladstone Bradley
ATTY.

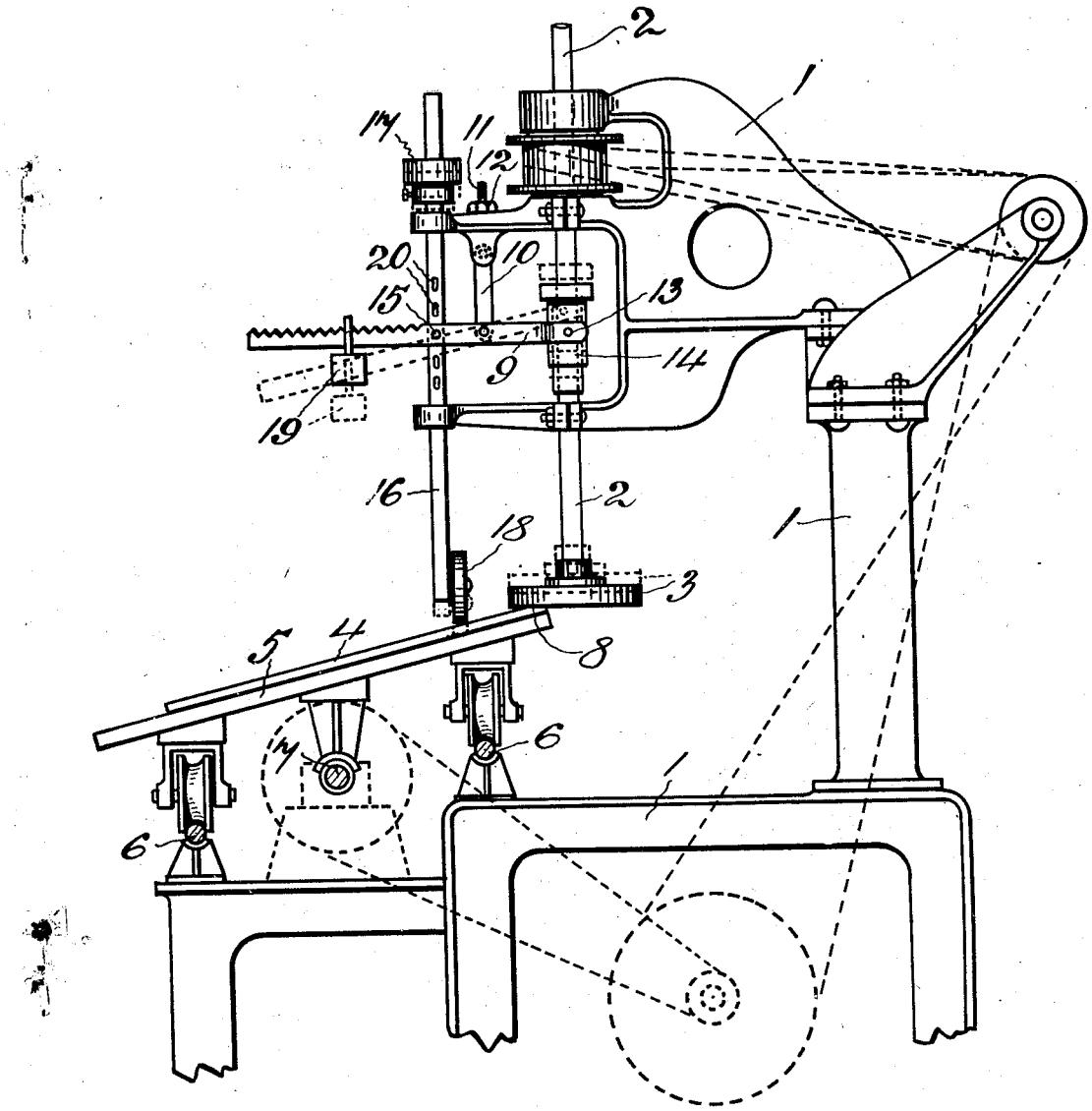

UNITED STATES PATENT OFFICE.

HAROLD GLADSTONE BRADLEY, OF CHRISTCHURCH, NEW ZEALAND.

GLASS GRINDING AND POLISHING MACHINE.

1,183,947. Specification of Letters Patent. Patented May 23, 1916.

Application filed July 9, 1915. Serial No. 39,026.

*To all whom it may concern:*

Be it known that I, HAROLD GLADSTONE BRADLEY, a subject of the King of Great Britain, residing at 782 Colombo street, Christchurch, in the Dominion of New Zealand, have invented new and useful Improvements in Glass Grinding and Polishing Machines, of which the following is a specification.

This invention relates to a machine for grinding and polishing glass and refers to that particular type of machine wherein a graduated series of grinding and polishing wheels are arranged in a line upon a series of vertical spindles so that each may be brought into use so as to operate upon the glass. In machines of this nature as hitherto employed however the selection of the wheels has been under the control of the operator and consequently the process has consisted of a series of independent operations.

It is the object of the present invention however to provide a machine of this nature adapted to operate automatically for the purpose of beveling the glass and polishing to a finish at one continuous operation thus very materially reducing the time and labor involved in such process as compared with existing means.

In carrying this object into effect the construction consists essentially of providing the table, upon which the glass is supported, with a means of travel operated automatically by the machine so that the glass will be caused to come within range of each of such wheels in turn and in providing also means whereby each of the said wheels will be automatically brought into the operative position upon the glass arriving, in the course of its said travel, at the required position within range of such wheel.

In order that the nature of the said invention and its construction may be fully understood, reference will now be made to the accompanying drawings in which—

Figure 1 shows an end elevation of a machine constructed in accordance with the invention, and Fig. 2 shows an elevation of a machine having a series of spindles.

1 is a suitable framework in the upper portion of which are revolubly mounted a series of vertical spindles 2 arranged in a line extending longitudinally of the machine and each provided at its lower end with a grinding or polishing wheel 3 which latter are suitably graduated from a coarse grinding wheel at one extremity of the machine to a fine polishing or finishing wheel at the other end of such machine.

To support the glass 4, a table or carriage 5 is provided and supported upon runners or guides 6 so as to be capable of traversing the whole length of the machine under action of a leading-screw 7, during which process every portion of the edge 8 of the glass 4 will come within range of each of the wheels 3 in turn.

The wheels 3, although continuously revolved by the machine, are normally controlled upward at a position clear of the glass and from which position each of such wheels is caused to descend into the operative position upon the glass reaching the required point beneath it. For this purpose each of the wheels 3 is floatably arranged in a vertical direction in respect to the framework 1. As here shown each of the spindles 2 is adapted to sliding movement in its bearings in the framework, while to control such spindle a horizontal lever 9 is provided and fulcrumed at its intermediate portion by means of a link 10 depending by means of a screwed shank 11 and nut 12 from the framework, so as to provide a means of adjusting the height of the link. Upon one end of the lever 9 is provided a fork or striker 13 adapted to engage in a circumferential groove formed in a collar or boss 14 carried upon the spindle 2 so as to cause the latter to move upward or downward in response to a turning of the lever 9 upon its fulcrum. To effect the required movement of the lever 9 the portion of the latter upon the other side of the said fulcrum, is connected, as by means of a pivot or pin 15 with a rod 16 slidably mounted in a vertical direction in the framework, the arrangement being such that an upward movement of the rod 16 will produce a downward movement of the spindle 2 while a downward movement of the rod will produce an upward movement of the spindle. To cause the spindle and its wheel 3 to assume their normal upward positions, the rod 16 is loaded, as by means of a weight 17 or the equivalent. Upon the glass 4 reaching in the course of its travel, a position within range of the wheel 3 however the surface of such glass will come into engagement with and so lift a roller 18 carried upon the lower end of the rod 16 thereby raising the latter and consequently depressing the spindle 2 so that its wheel 3 will come into the operative position and perform the grinding of the glass as shown in the drawing. In this manner each of the wheels 3 as the glass approaches it will, by the action of the glass in raising its particular rod 16, be brought into the operative position or position of contact with the glass. The wheels will therefore remain in this condition so long as the glass continues to pass beneath them or until the rear end of the glass has passed clear of each roller 18 whereupon the upward pressure being removed, the rod 16 will return under action of its weight 17, to its former lower position and in doing so will again raise the spindle 2 and its wheel 3.

In order to enable the pressure of the wheel 3 upon the glass to be conveniently varied according to requirements, the end of the lever 9 projects for a suitable distance beyond the rod 14 and is provided with a weight or poise 19 adjustable to any position lengthwise upon such portion of the lever, the tendency of such poise being to partly counter-balance the weight of the wheel 3.

In order to enable the height of the rod 16 to be adjusted so as to suit varying sizes of wheels, such rod is provided with a series of holes 20 each adapted to receive the pin 15. The said holes 20 are preferably slightly slotted or elongated as shown in order to permit of a slight amount of loose movement of the spindle and so avoid the danger of damage to the glass through the wheel being forced down upon it by the rod 16.

Although in the foregoing description the floating action of the grinding and polishing wheels 3 is provided by making the spindles 2 slidable in their bearings, it is obvious that this purpose might be attained in other ways. For instance the spindle might be fixed from vertical movement and the wheel 3 carried upon a sleeve slidable upon such spindle and adapted to be rotated thereby.

It will be obvious that instead of arranging the wheels above the glass so as to operate upon the upper surface of the latter, the arrangement may be reversed so that the wheels will be caused to operate upon the underside of the glass. In such case the construction will be similar to that already described except that the wheels, their spindles and their said controlling means will be inverted and arranged beneath instead of above the glass.

In either of the above mentioned arrangements it will be understood that instead of the glass engaging the rollers 18, the carriage upon which glass is supported may be employed for this purpose. Again in the case of the means whereby the floating action of the wheels are controlled, it will be understood that this purpose may be effected by the use of various modifications and substitutes of the means hereinbefore described. The invention is not therefore to be construed as applying merely to this specific construction but includes within its scope a means whereby the glass or the carriage supporting it will cause each wheel to assume its operative position upon the glass arriving in the course of its travel at the desired position within range of such wheel.

I claim:—

In a machine of the class described wherein a graduated series of grinding and polishing wheels are arranged in a line upon a series of vertical spindles and means whereby the glass will be caused to come within range of each of said wheels in turn, of means whereby each of said wheels will be independently controlled so as to lie normally in the inoperative position, and trip mechanisms (one for each wheel) each adapted to be actuated by the glass or the carriage so as to bring its corresponding wheel into the operative position in opposition to the said normal controlling means when such wheel and the glass arrive in the required relative positions.

In testimony whereof I have signed my name to this specification in the presence of two subscribing witnesses.

HAROLD GLADSTONE BRADLEY.

Witnesses:
 JOHN HAZLITT UPHAM,
 SIDNEY JAMES.